(12) United States Patent
Erentok et al.

(10) Patent No.: US 9,705,549 B1
(45) Date of Patent: Jul. 11, 2017

(54) ANTENNA FOR WEARABLE ELECTRONIC DEVICES

(71) Applicant: Intel Corporation, Santa Clara, CA (US)

(72) Inventors: Aycan Erentok, Sunnyvale, CA (US); Huan-Sheng Hwang, San Diego, CA (US); John Groff, San Francisco, CA (US); Thomas H. Liu, Fremont, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/193,356

(22) Filed: Jun. 27, 2016

(51) Int. Cl.
| | |
|---|---|
| H04B 1/38 | (2015.01) |
| H04B 1/3827 | (2015.01) |
| H04W 4/00 | (2009.01) |
| H04W 4/20 | (2009.01) |

(52) U.S. Cl.
CPC ............ *H04B 1/385* (2013.01); *H04W 4/008* (2013.01); *H04W 4/203* (2013.01); *H04B 2001/3861* (2013.01)

(58) Field of Classification Search
CPC H04B 1/385; H04B 2001/3861; H04W 4/008
See application file for complete search history.

(56) References Cited

U.S. PATENT DOCUMENTS

| | | | | | |
|---|---|---|---|---|---|
| 5,699,319 | A | * | 12/1997 | Skrivervik | G04G 21/04 343/718 |
| 2005/0219955 | A1 | * | 10/2005 | Xu | G04G 21/04 368/88 |
| 2007/0109208 | A1 | * | 5/2007 | Turner | H01Q 1/273 343/718 |
| 2009/0034372 | A1 | * | 2/2009 | Fujisawa | G04C 9/02 368/14 |
| 2016/0020506 | A1 | * | 1/2016 | Mahanfar | H01Q 1/273 343/718 |

FOREIGN PATENT DOCUMENTS

| | | |
|---|---|---|
| CN | 203932307 U | 11/2014 |
| CN | 204009393 U | 12/2014 |
| CN | 204481128 U | 7/2015 |
| WO | 2015-117647 A | 8/2015 |

\* cited by examiner

*Primary Examiner* — Nguyen Vo
(74) *Attorney, Agent, or Firm* — Grossman, Tucker, Perreault & Pfleger, PLLC

(57) ABSTRACT

A wearable electronic device includes a first member and a second member. The second member includes a first, RF-attenuating, portion and a second, electrically conductive portion. A gap exists between the first member and at least the second portion of the second member. One or more transmitter/receivers, such as one or more BLUETOOTH®, BLUETOOTH® low energy, and/or IEEE 802.11 transceivers may be mounted in the first member. The one or more transmitter/receivers are conductively coupled to the second portion of the second member. RF signals generated by the one or more transceivers are emitted from the second portion of the second member.

25 Claims, 8 Drawing Sheets

ANTENNA FOR WEARABLE ELECTRONIC DEVICES

TECHNICAL FIELD

The present disclosure relates to antennas useful with wearable electronic devices.

BACKGROUND

Current trends in the connected wearable world lean towards multiple connectivity functions to enrich user experiences within a very limited design volume provided by most wearable electronic devices. In order to provide differentiation in an increasingly crowded market segment, industrial designers have gravitated towards the use of exotic and/or precious materials (e.g., titanium, high-grade stainless alloys, gold, silver, platinum, and similar) for the body or housing of the electronic device to provide an aesthetically pleasing and attractive exterior finish. Typically, the wearable electronic device wirelessly connects to other local devices such as smartphones, tablet computers, or other wearable devices using communications protocols such as BLUETOOTH® (BT), BLUETOOTH Low Energy (BLE), and Near Field Communications (NFC). In addition, the wearable electronic device may also connect to wide area networks (e.g., the Internet via IEE 802.11) and may, in addition, receive stand-alone satellite content (e.g., global positioning data via GPS/GLONASS/Galileo). The demands placed on the antenna systems used in such small form factor wearable electronic devices are extreme, demanding exceptional antenna performance to provide a favorable user experience when disposed proximate the user's body or closely worn apparel.

Modern electronic designs increasingly rely upon the use of touchscreens to provide a compact input/output (I/O) interface that provides the device user with an intuitive interaction with the device. Unfortunately, the digital touch module (DTM) used to provide touchscreen capabilities, typically introduce significant losses in antenna efficiency. The indium tin oxide (ITO) layers used in fabricating the DTM is a relatively lossy conductor (e.g., $150\Omega/\square$) and high E-fields produced by the antennas disposed proximate a portion of the device the device couple to the DTM causing losses that often exceed 10 dB. It is believed the coupling of E-fields is due mainly to the fact that the top portion of the device body or housing radiates and produces a relatively high current proximate the glass surface of the DTM. The top portion of the device is preferred to minimize the user introduced losses, i.e. hand loss for a wearable device.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
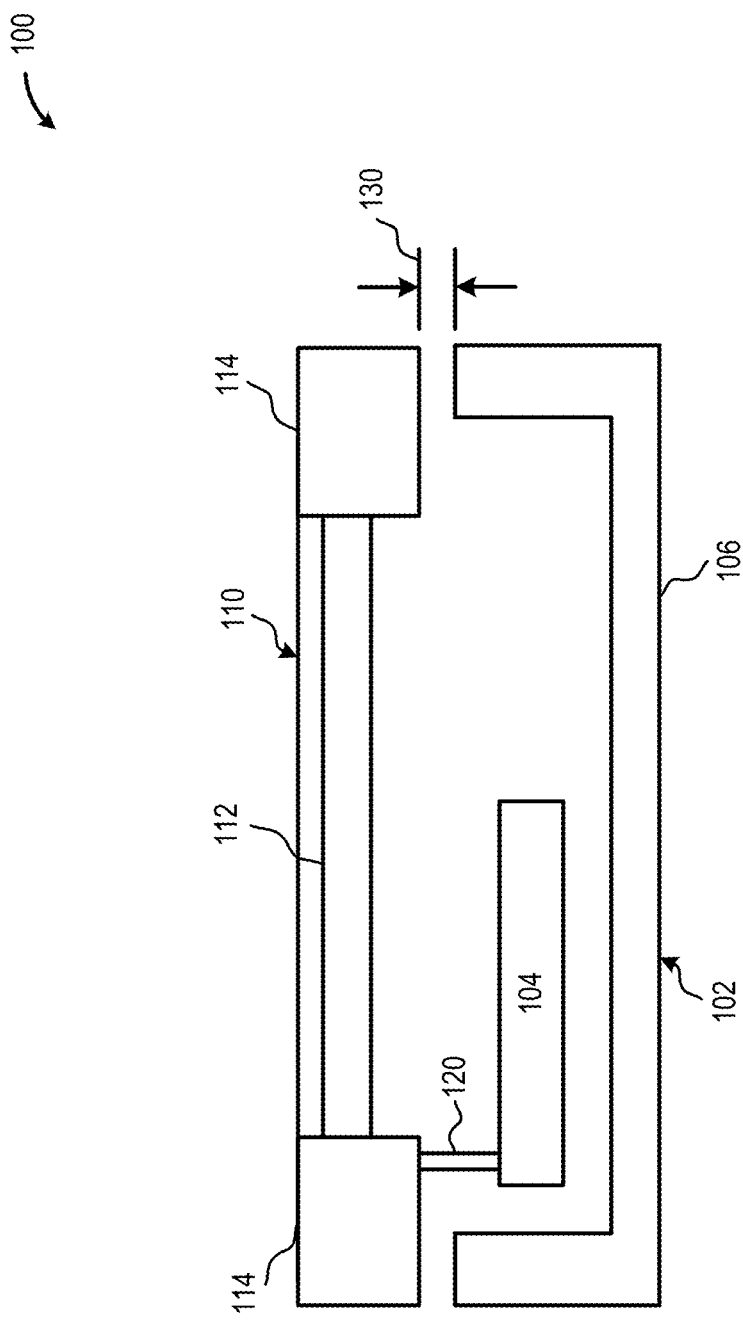
FIG. 1 depicts an illustrative wearable electronic device that includes a multi-piece housing that includes at least a first member and an operably coupled second member separated by a gap, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The systems and methods described herein provides a new and innovative antenna topology that enables BLUETOOTH®; BLUETOOTH Low Energy, IEEE 802.11, Global Navigation Satellite System (GNSS), and NFC antennas to operate in the relatively small form factor in the presence of a DTM module provided by most wearable electronic devices. The systems and methods described herein radiate the electromagnetic signal produced by the antenna systems in the wearable electronic device away from the body of the device user. In embodiments, on version of the antenna systems and methods described herein radiate similar to a top-loaded monopole antenna system designed to use two conductors within an Internet of things (IoT) device. The IoT device includes a conductive top portion and a conductive bottom portion with a limited radio frequency (RF) opening on the top of the device.

The systems and methods described herein provide single- or multi-band antennas in an IoT device constructed with a full-metallic body and a limited RF opening in the presence of a DTM. The systems and methods described herein provide significant and innovative advances over current systems and methods used in wearable electronic device. These advances include: antennas located away from the user's skin surface to minimize absorption losses and improve antenna radiation efficiency. The systems and methods described herein further minimize the losses attributable to a DTM positioned proximate the transmitter/receiver and requires minimal opening in the metal housing of the wearable electronic device.

In embodiments, the systems and devices described herein make use of a conductive shield positioned between the DTM and the transmitter/receiver. The conductive shield is electrically conductively coupled to the upper portion (usually a cosmetic portion) of the wearable electronic device. In some implementations, an NFC antenna may be positioned between the DTM and the conductive shielding to provide physical support and enable certain user experiences. The top and bottom portions of the wearable electronic device are separated by a gap enabling antenna to radiate and also useful for improving antenna performance. The GNSS and BLUETOOTH/Wi-Fi antenna(s) are fed directly from a corresponding transmitter/receiver to the conductive shield using electrical contacts.

A wearable electronic device is provided. The wearable electronic device may include a multi-piece housing that includes at least a first member worn proximate a user's body, and an operably coupled, electrically isolated, second member, where the second member includes at least a first portion that includes a material that attenuates radio frequency energy and a second portion that includes an electrically conductive material; and where a gap physically separates the first member from at least the second portion of the second member. The wearable electronic device may also include a transmitter/receiver disposed at least partially within the first member and at least one conductive member conductively coupling the transmitter/receiver to the second portion of the second member.

A radio frequency (RF) signal transmission method using a wearable electronic device is provided. The method may include disposing a transmitter/receiver at least partially in a first member of a wearable multi-piece electronic device housing; operably coupling a second member of the multi-piece electronic device housing to the first member, the second member electrically isolated from the first member, the second member including at least a first portion that includes a material that attenuates radio frequency energy and a second portion that includes an electrically conductive material; separating at least the second portion of the second member from the first member via a gap; and conductively coupling the second portion of the second member to the transmitter/receiver via at least one conductive member.

A radio frequency (RF) signal transmission system using a wearable electronic device is provided. The system may include a means for disposing a transmitter/receiver at least partially in a first member of a wearable multi-piece electronic device housing, a means for operably coupling a second member of the multi-piece electronic device housing to the first member, the second member electrically isolated from the first member, the second member including at least a first portion that includes a material that attenuates radio frequency energy and a second portion that includes an electrically conductive material, a means for separating at least the second portion of the second member from the first member via a gap; and a means for conductively coupling the second portion of the second member to the transmitter/receiver via at least one conductive member.

As used herein, the term "wearable electronic device" refers to any electronic device capable of being attached, affixed, or placed proximate at least a portion of the device user's body. Example wearable electronic devices may include, but are not limited to, eyewear (e.g., Google Glass®, Google, Inc. Mountain View, Calif.); pendants, bracelets, braces, broaches, rings, watches, and similar wearable devices or fashion appurtenances.

As used herein, the terms "top," "bottom," "up," "down," "upward," "downward," "upwardly," "downwardly" and similar directional terms should be understood in their relative and not absolute sense. Thus, a component described as being "upwardly displaced" may be considered "laterally displaced" if the device carrying the component is rotated 90 degrees and may be considered "downwardly displaced" if the device carrying the component is inverted. Such implementations should be considered as included within the scope of the present disclosure.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

FIG. 1 depicts an illustrative wearable electronic device 100 that includes a multi-piece housing that includes at least a first member 102 and an operably coupled second member 110 separated by a gap 130, in accordance with at least one embodiment of the present disclosure. As depicted in FIG. 1, the second member 110 may include a first portion 112 that includes one or more materials capable of attenuating a radio frequency (RF) signal and an electrically conductive second portion 114. One or more transmitter/receivers 104 are at least partially disposed in, on, or about the first member 102. One or more electrically conductive contacts 120 conductively couple the one or more transmitters/receivers 104 to the electrically conductive second portion 114 of the second member 110.

The first member 102 may form at least a portion of the external housing of the wearable electronic device 100. For example, the first member 102 may include, but is not limited to, a watch case that contains at least some of the mechanical and/or electromechanical components used to provide a timepiece. In embodiments, the first member 102 may include a floor 106 partially or completely surrounded by a perimeter wall 108 that forms a partially enclosed void space 109 within the first member 102. The first member 102 may be fabricated using one or more conductive materials including one or more conductive metallic materials and/or one or more conductive non-metallic materials. For example, the first member 102 may be fabricated using one or more conductive metals or metal alloys including, but not limited to: gold, silver, platinum, steel, stainless steel, magnesium, aluminum or alloys containing one or more of the aforementioned. In another example, the first member 102 may be fabricated using one or more conductive non-metals including, but not limited to: graphene, conductive polymers, polymers containing one or more conductive materials (e.g., silver nanowires in a polymer matrix), or similar.

The first member 102 may have any physical size, shape, or configuration. For example, the first member 102 may include a physical configuration that is circular, oval, rectangular, square, triangular, trapezoidal, or any combination thereof. The first member 102 may be fabricated as a single-piece or may include a multi-piece assembly that is affixed, bonded, or otherwise physically coupled or attached to form a unitary assembly to which individual components may be permanently or detachably affixed. The first member can have any physical dimensions capable of being borne, worn, transported, or otherwise carried proximate the external surface (e.g., skin, clothing) of the device user.

The first member 102 includes a floor portion 106 and a peripheral wall portion 108 that borders the floor portion 106. In embodiments, the floor portion 106 and the wall portion 108 may be fabricated as a unitary structure. Although the floor portion 106 is depicted in FIG. 1 as a flat surface forming the bottom of the electronic device 100, the floor portion 106 may have any shape or physical configuration, such as concave, convex, angled, or any combination thereof.

One or more transmitter/receivers 104 may be disposed in a cavity or similar void space 109 formed at least in part by the floor portion 106 and the peripheral wall portion 108 of the first member 102. The one or more transmitter/receivers 104 may include one or more transmitter/receivers or transceivers capable of transmitting and/or receiving radio frequency signals in one or more frequencies, frequency ranges, or frequency bands. In embodiments, the one or more transmitter/receivers 104 may include, but are not limited to, one or more IEEE 802.11 (WiFi®) compliant transceivers, one or more BLUETOOTH® compliant transceivers, one or more BLUETOOTH low energy (BLE)/BLUETOOTH® Smart transceivers, one or more Near Field Communication (NFC) transceivers, one or more cellular communication (e.g., 3G, 4G, 5G, LTE, CDMA, GSM) transceivers or combinations thereof. In at least some implementations, the one or more transceivers 104 may be stand-alone components or may be included as a portion of a larger system, for example a system on a chip (SoC) or similar processor-based device. In some implementations, the one or more transmitter/receivers 104 may include or may be coupled to one or more frequency diplexers to permit the generation and transmission/reception of information and/or data over a plurality of different frequency ranges.

The second member 110 includes a first portion 112 that attenuates incident radio frequency signals and a second portion 114 that is electrically conductive and propagates incident radio frequency signals. The second member 110 is operably coupled to the first member 102 and may partially or completely enclose the void space 109 formed in the first member 102. The second member 110 is electrically isolated from the first member 102 and the first member 102 and at least the second portion 114 of the second member 110 may be physically separated by a gap 130. The separation distance (i.e., the width of the gap) between the first member 102 and the second portion 114 of the second member 110 may be selected, in some implementations, based on the RF signals produced by the one or more transmitters/receivers 104. The gap 130 between the first member 102 and the second portion 114 of the second member 110 may be about 0.2 millimeters (mm) or less; about 0.3 mm or less; about 0.5 mm or less; about 0.7 mm or less; about 0.9 mm or less; about 1.0 mm or less; about 1.3 mm or less; or about 1.5 mm or less. In some implementations, the gap 130 between the first member 102 and the second portion 114 of the second member 110 may be selected or otherwise determined, in whole or in part, based on a desired resonant frequency for the RF signals produced or otherwise generated by the one or more transmitters/receivers 104.

The first portion 112 of the second member 110 may include one or more RF attenuating materials. For example, the first portion 112 of the second member 110 may include a display touch module containing a number of transparent conductive layers having a reduced resistance. Such transparent conductive layers may include transparent conductive materials such as indium tin oxide (ITO), transparent conductive polymers, transparent structures (e.g., metallic nanostructures, conductive graphene nanostructures) embedded in a polymer matrix, or any combination thereof. In addition, the first portion 112 of the second member 110 may include one or more glass layers (e.g., sapphire/aluminum oxide glass, GORILLA® glass) that contribute to the RF attenuating properties of the first portion 112 of the second member 110. Further, the first portion 112 of the second member 110 may include display devices, such as the anode and cathode found in organic light emitting diode (OLED) displays.

The second portion 114 of the second member 110 may include one or more electrically conductive materials capable of supporting the propagation of the RF signals produced by the one or more transmitters/receivers 104. All or a portion of the second portion 114 of the second member 110 may be exposed, providing functional and/or aesthetic features to the electronic device 100. In embodiments, all or a portion of the second portion 114 of the second member 110 may be covered by one or more layers or coatings of a material transparent to RF signals. Such layers or coatings may include one or more aesthetic coatings and/or one or more functional coatings. In embodiments, all or a portion of the second portion 114 of the second member 110 may include one or more electrically conductive metals or metal alloys including, but not limited to: gold, silver, platinum, steel, stainless steel, magnesium, aluminum or alloys containing one or more of the aforementioned. In another example, all or a portion of the second member 110 may be fabricated using one or more conductive non-metals including, but not limited to: graphene, conductive polymers, polymers containing one or more conductive materials (e.g., silver nanowires in a polymer matrix), or similar. In some implementations, the composition of all or a portion of the second portion 114 of the second member 110 may be based on the frequency of the RF-signals produced or otherwise generated by the one or more transmitters/receivers 104. In at least one embodiment, the second portion 114 of the second member 110 may include a watch bezel or similar conductive structure that partially or completely encircles the face of a digital or analog timepiece.

In some implementations, the second portion 114 of the second member 110 may include a single, electrically conductive, segment such that the segment forming the entire second portion 114 provides a radiating surface (e.g., an antenna) for a single-band RF signal provided or otherwise produced by the one or more transmitters/receivers 104. In other implementations, the second portion 114 of the second member 110 may be equally or unequally divided into a plurality of isolated, electrically conductive, segments such that each of the plurality of segments provides a respective radiating surface for respective ones of a plurality of single-band RF signals provided or otherwise produced by the one or more transmitters/receivers 104.

One or more electrically conductive members 120 conductively couples the one or more transmitters/receivers with the second portion 114 of the second member 110. The one or more electrically conductive members 120 may include any number and/or combination of devices and/or systems to electrically conductively couple the one or more transmitters/receivers 104 to the second portion 114 of the second member 110. In some implementations, the one or more transmitters/receivers 104 may generate a plurality of RF signals, each in a different frequency band. In such implementations, one or more electrically conductive members 120 may be conductively couple each of the one or more transmitters/receivers 104 to one or more segments of the second portion 114 of the second member 110. The electrically conductive members 120 may include one or more spring clips or similar tensioned electrically conductive members capable of providing an electrically conductive pathway from the one or more transmitters/receivers 104 to all or a portion of the electrically conductive second portion 114 of the second member 110.

Figure 2:
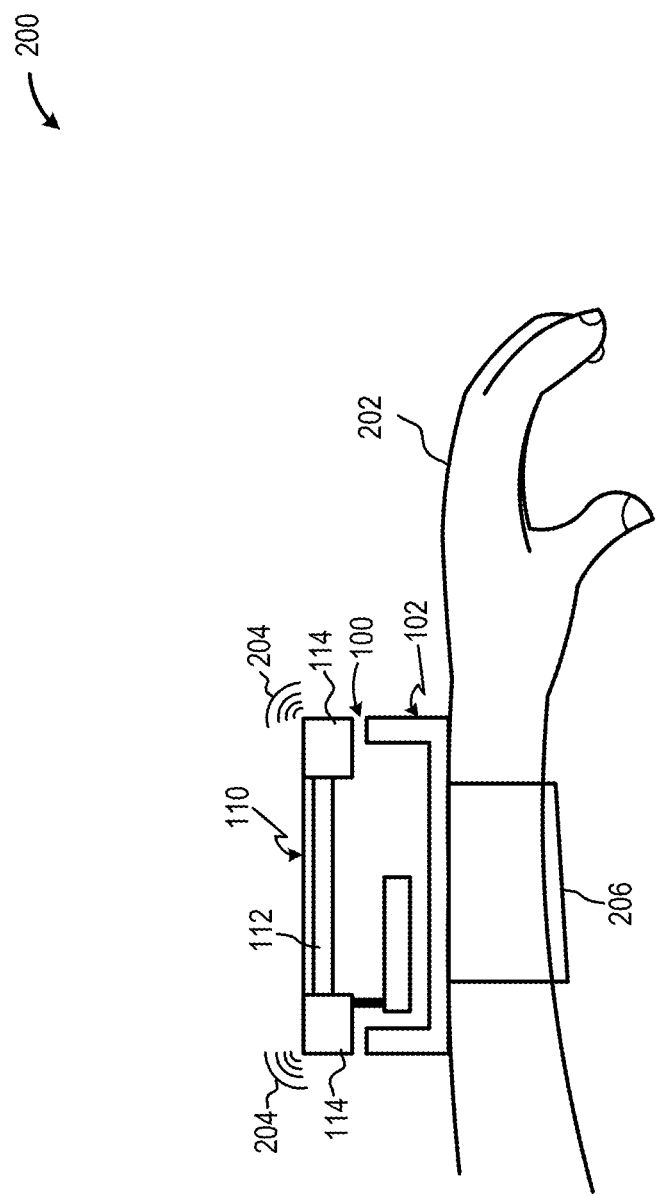
FIG. 2 is a partial sectional view of a system that includes illustrative wearable electronic device mounted on an arm of a device user, in accordance with at least one embodiment of the present disclosure.

FIG. 2 is a partial sectional view of a system that includes illustrative wearable electronic device 100 mounted on an arm 202 of a device user, in accordance with at least one embodiment of the present disclosure. As depicted in FIG. 2, the second portion 114 of the second member 110 radiates the RF signal 204 produced or otherwise generated by the one or more transmitters/receivers 104 in the electronic device 100. As depicted in FIG. 2, one or more fasteners, pins, belts, straps of similar attachment fixtures 206 may be operably coupled to the electronic device 100. Such attachment fixtures 206 may cause the placement of the electronic device proximate the body of the device user 202.

Beneficially, the energy carried by the RF signal 204 is emitted by the electronic device 100 in directions that minimize the detrimental effects of attenuation caused by components in the first portion 112 of the second member 100 as well as attenuation caused by the body of the device user 202. Such an arrangement may minimize any detrimental effect of the RF signals 204 on the device user 202 by causing the RF signal 204 to radiate in an outward direction, away from the device user 202. Such an arrangement may also assist in minimizing the likelihood of interference with other electromechanical or electrical devices (e.g., pacemakers) used by the device user 202 by directing the RF signals 204 emitted by the electronic device in a direction away from the device user 202.

Figure 3:
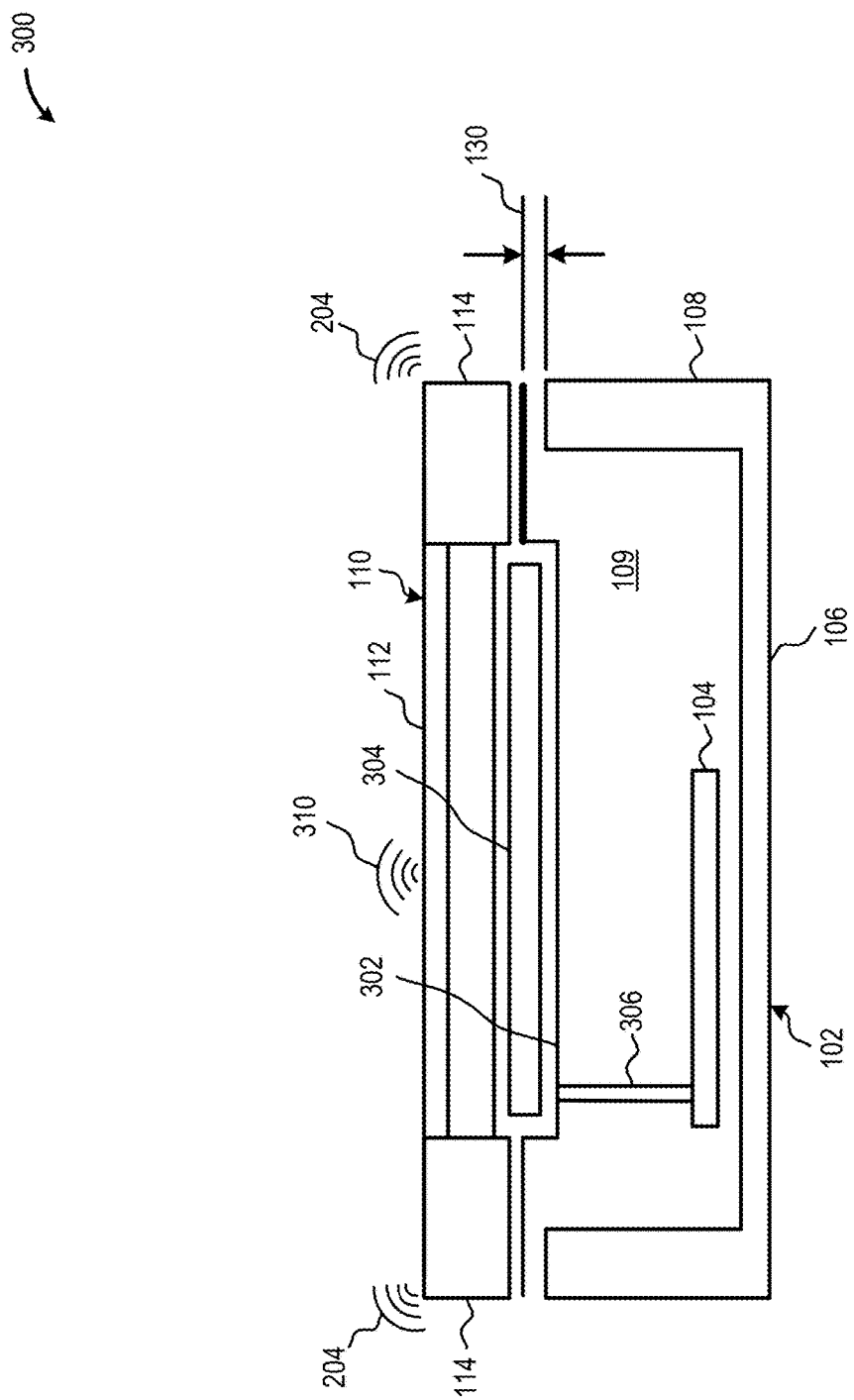
FIG. 3 is a cross-section of another illustrative wearable electronic device that includes an electrically conductive shield member and a Near Field Communication (NFC) antenna disposed between the transmitter/receiver and the RF-attenuating first portion of the second member, in accordance with at least one embodiment of the present disclosure.

FIG. 3 is a cross-section of another illustrative wearable electronic device 300 that includes an electrically conductive shield member 302 and a Near Field Communication (NFC) antenna 304 disposed between the transmitter/receiver 104 and the RF-attenuating first portion 112 of the second member 110, in accordance with at least one embodiment of the present disclosure. As depicted in FIG. 3, in embodiments, the shield member 302 may be electrically conductively coupled to all or a portion of the second portion 114 of the second member 110. In embodiments, the shield member 302 may be electrically isolated from the first portion 112 of the second member 110. One or more electrically conductive members 306 conductively couples the one or more transmitters/receivers 104 to the shield member 302 which, in turn, conductively couples to the second portion 114 of the second member 110. As depicted in FIG. 3, an RF signal 310 from the NFC antenna 304 may pass through the RF attenuating first portion 112 of the second member 110.

The shield member 302 may include any number and/or combination of devices and/or systems capable of electrically shielding at least a portion of the void space 109 in the first member from the RF attenuating first portion 112 of the second member 110 while electrically conductively coupling the one or more transmitters/receivers 104 to the second portion 114 of the second member 110. In some implementations, the shield member 302 may be fabricated using one or more electrically conductive metals and/or one or more electrically conductive metal alloys. Examples include, but are not limited to, copper, silver, gold, platinum, steel, stainless steel, aluminum, and/or alloys thereof. In some implementations, the shield member 302 may be fabricated using one or more conductive non-metallic materials, such as graphene, or one or more materials containing electrically conductive materials, such as metallic nanowires.

The shield member 302 is electrically conductively coupled to the second portion 114 of the second member 110. In some implementations, the conductive coupling between the shield member and the second portion 114 of the second member 110 may include one or more electrically conductive bonding agents, such as an electrically conductive adhesive or similar. In some implementations, the conductive coupling between the shield member 302 and the second portion 114 of the second member 110 may include one or more fasteners, such as one or more electrically conductive spring clips, screws, bolts, or similar detachably attachable or non-detachably attachable fasteners. In some implementations, the conductive coupling between the shield member 302 and the second portion 114 of the second member 110 may include mechanical attachment, such as by welding, soldering or brazing.

The NFC antenna 304 may include any number and/or combination of devices and/or systems capable of radiating RF electromagnetic energy 310 in the form of one or more signals at or about one or more NFC frequencies, such as around 13.56 megahertz (MHz). Since NFC is intended to operate at very short distances (e.g., 2 to 4 centimeters), the attenuation provided by the first portion 112 of the second member 110 is acceptable and the NFC antenna 304 may be disposed between the upper surface of the shield member 302 and the first portion 112 of the second member 110. The shield member 302 works as a natural Faraday cage for the first portion 112 of the second member 110 to mitigate the losses and ferrite material that is part of the NFC antenna, and also is part of a single and/or multi-band antenna that radiates together with 114.

The electrically conductive member 306 conductively coupling the one or more transmitters/receivers 104 to the shield member 302 may include any number and/or combination of devices and/or systems capable of transmitting or otherwise communicating the RF signal 204 from the one or more transmitters/receivers 104 to the second portion 114 of the second member 110. In some implementations, the one or more transmitters/receivers 104 may generate a plurality of RF signals, each in a different frequency band. In such implementations, one or more electrically conductive members 306 may be conductively couple each of the one or more transmitters/receivers 104 to one or more segments of the second portion 114 of the second member 110. The electrically conductive members 306 may include one or more spring clips or similar tensioned electrically conductive members capable of providing an electrically conductive pathway from the one or more transmitters/receivers 104 to all or a portion of the electrically conductive second portion 114 of the second member 110. In some implementations, the one or more electrically conductive members 306 may also beneficially provide electrostatic discharge (ESD) protection for at least a portion of the electronic components included in the wearable electronic device 300. In some implementations, the one or more electrically conductive members 306 may also beneficially provide an antenna tuning element for use with the transmitter/receiver 104.

Figure 4:
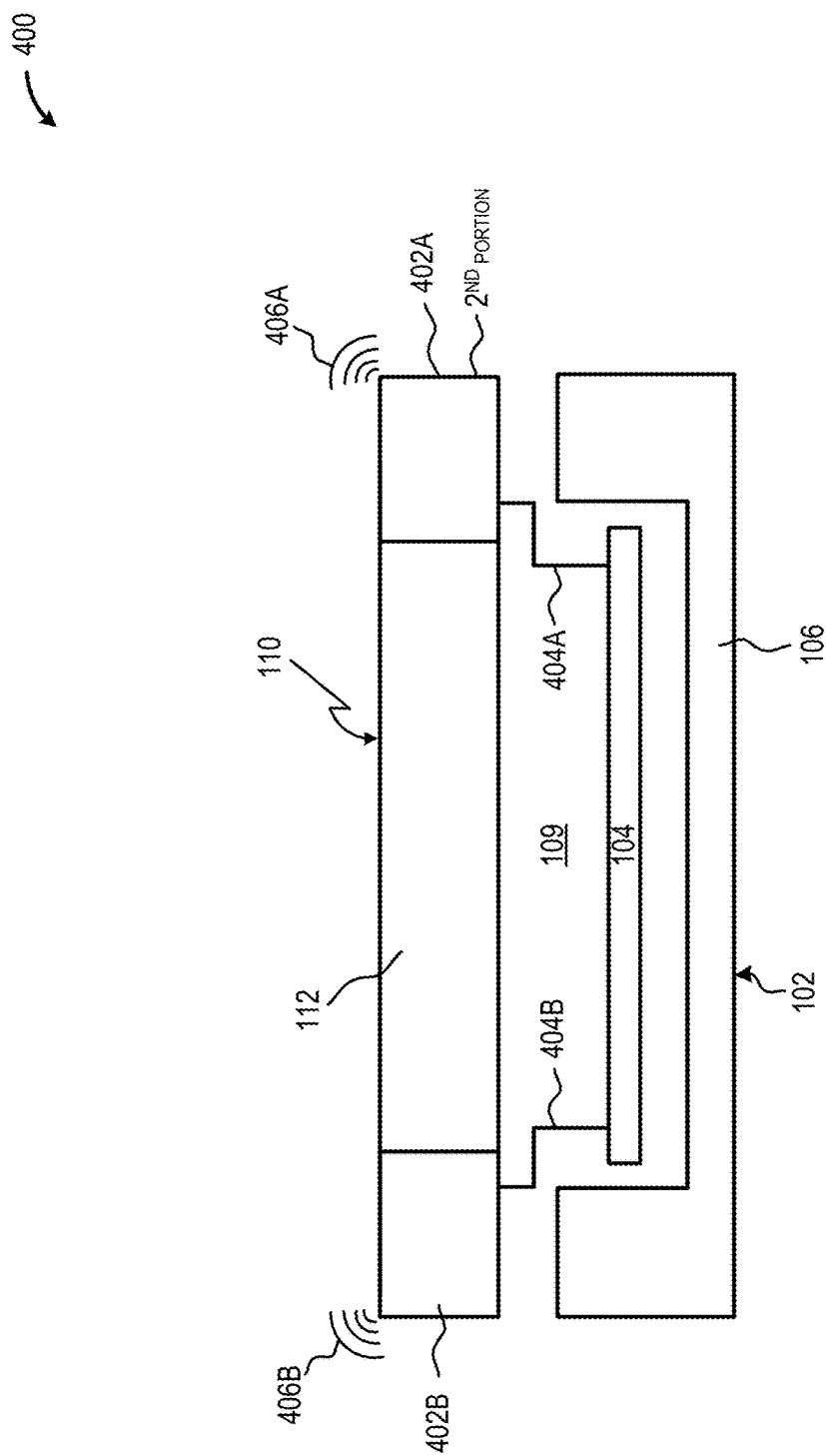
FIG. 4 is a cross-section of another illustrative wearable electronic device that includes a second member that having second portion that includes a plurality of segments and a plurality of electrically conductive members conductively coupling the one or more transmitter/receivers to respective ones of the segments, in accordance with at least one embodiment of the present disclosure.

FIG. 4 is a cross-section of another illustrative wearable electronic device 400 that includes a second member 110 that having second portion 114 that includes a plurality of segments 402A, 402B (collectively, "segments 402") and a plurality of electrically conductive members 404A, 404B (collectively, "electrically conductive member 404") electrically conductively coupling the one or more transmitters/receivers 104 to respective ones of the segments 402A, 402B, in accordance with at least one embodiment of the present disclosure. In some implementations, the one or more transmitters/receivers 104 may generate or otherwise produce a plurality of RF signals 406A, 406B (collectively, "RF signals 406"). Thus, in embodiments, each of some or all of the segments 402 may receive a different RF signal 406 from a respective one of the one or more transmitters/receivers 104. In some implementations, some or all of the segments 402 may emit/receive more than one RF signal 406. For example, some or all of the segments 402 may emit/receive a first RF signal 406A in a first frequency band and a second RF signal 406B in a second frequency band. Such multi-band signals may be generated, for example, using one or more diplexers to combine the different frequency RF signals 402 to produce a single multi-band signal.

Figure 5A:
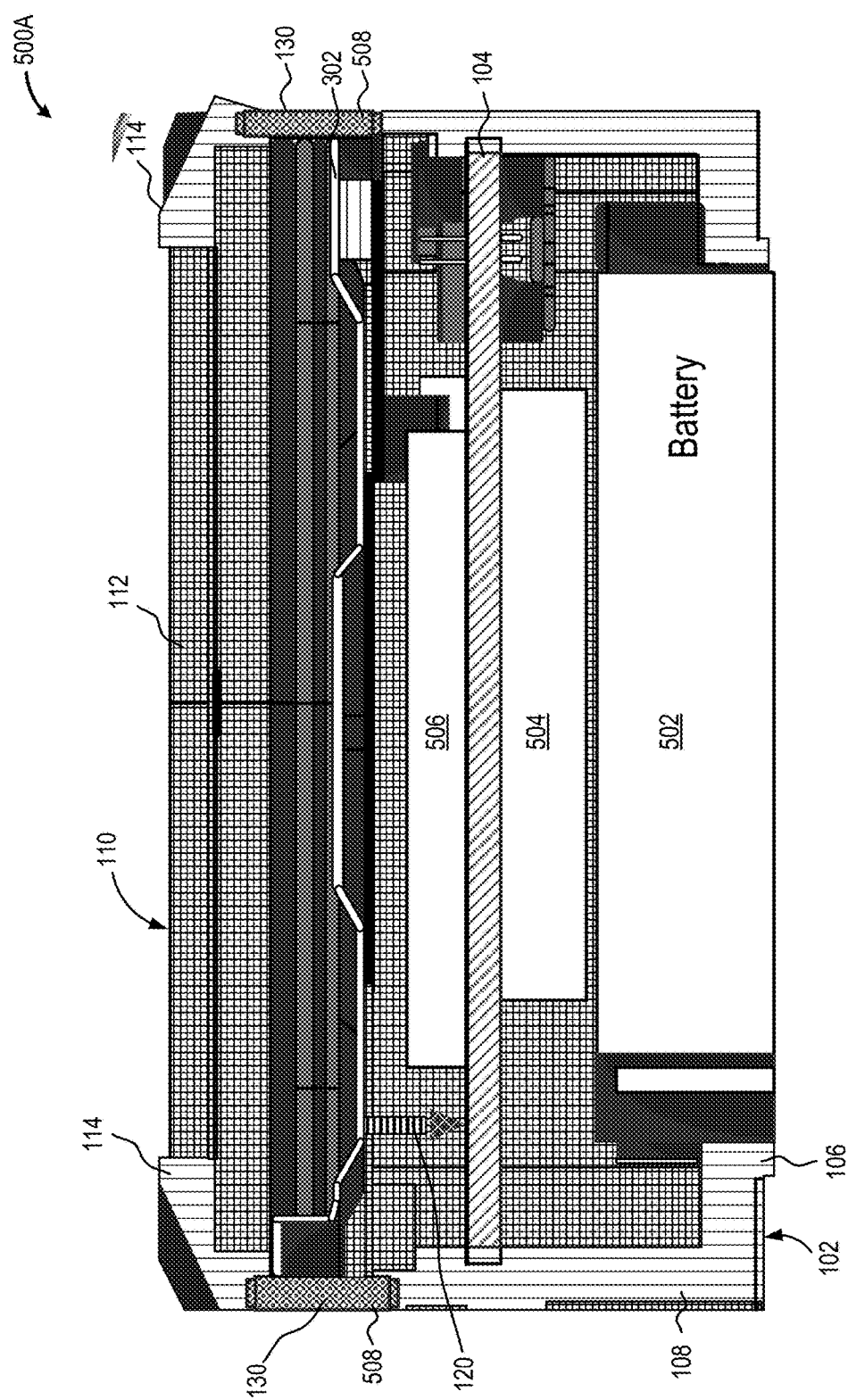
FIG. 5A is a cross-section of an illustrative wearable electronic device in the form of a wristwatch that includes a shield member disposed between the transmitter/receiver and the second member, in accordance with at least one embodiment of the present disclosure.
Figure 5B:
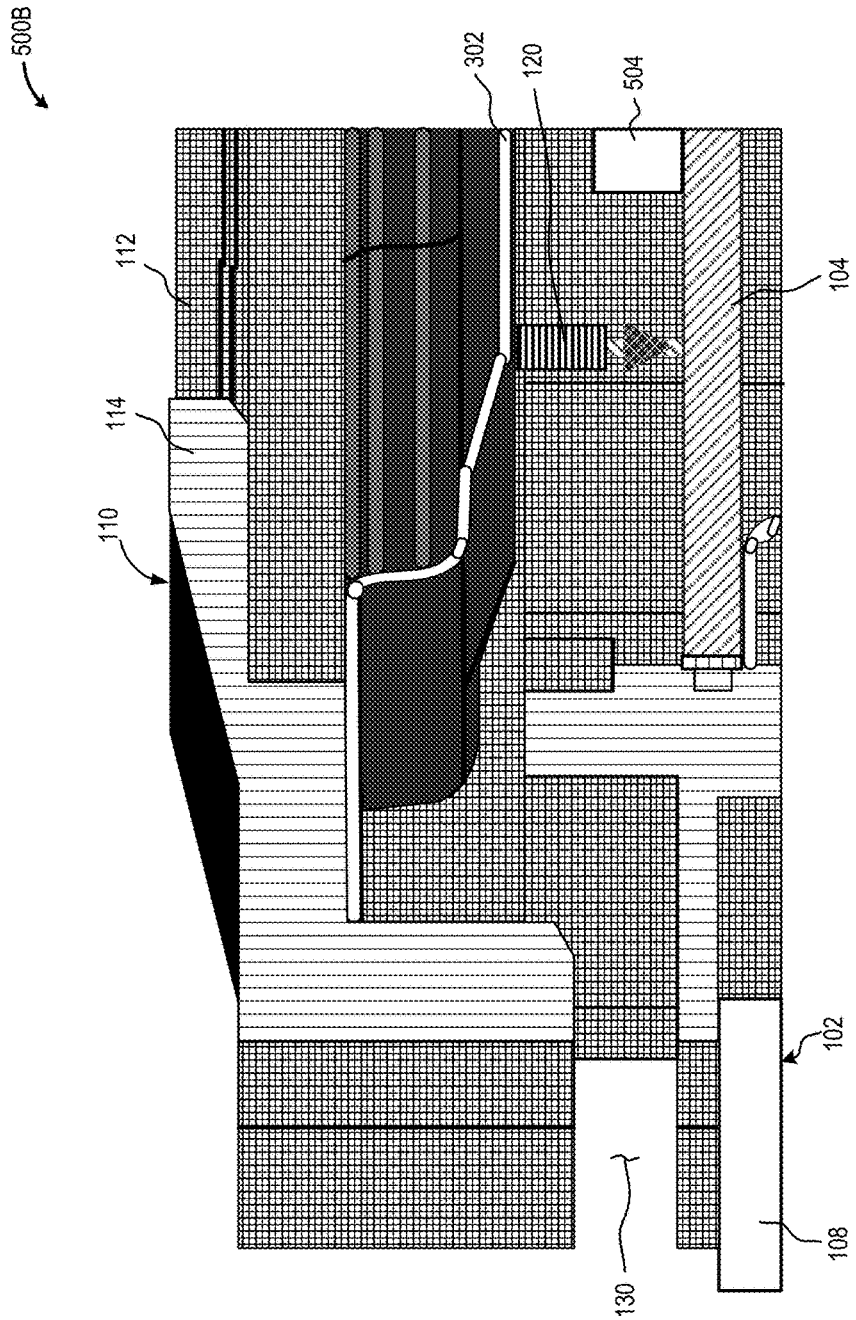
FIG. 5B is an exploded view cross-section of the example wristwatch depicted in FIG. 5A, in accordance with at least one embodiment of the present disclosure.

FIG. 5A and FIG. 5B is a cross-section of an illustrative wearable electronic device 500 in the form of a wristwatch that includes a shield member 302 disposed between the transmitter/receiver 104 and the second member 110, in accordance with at least one embodiment of the present disclosure. As depicted in FIG. 5A, the illustrative watch 500A may include an energy storage device 502, such as a primary (non-rechargeable) battery, a secondary (rechargeable) battery, a supercapacitor, an ultracapacitor, or similar energy storage device 502. The illustrative watch 500 may also include a lower RF shield member 504 disposed beneath the one or more transmitters/receivers 104 and an upper RF shield member 506 disposed above the one or more transmitters/receivers 104. Also as depicted in FIG. 5A, a gap filling material 508 that is transparent to RF signals may be disposed in whole or in part within all or a portion of the gap 130. The use of such a gap filling material 508 may beneficially improve the structural integrity of the watch 500A and may provide a water-proof watch enclosure.

Figure 6:
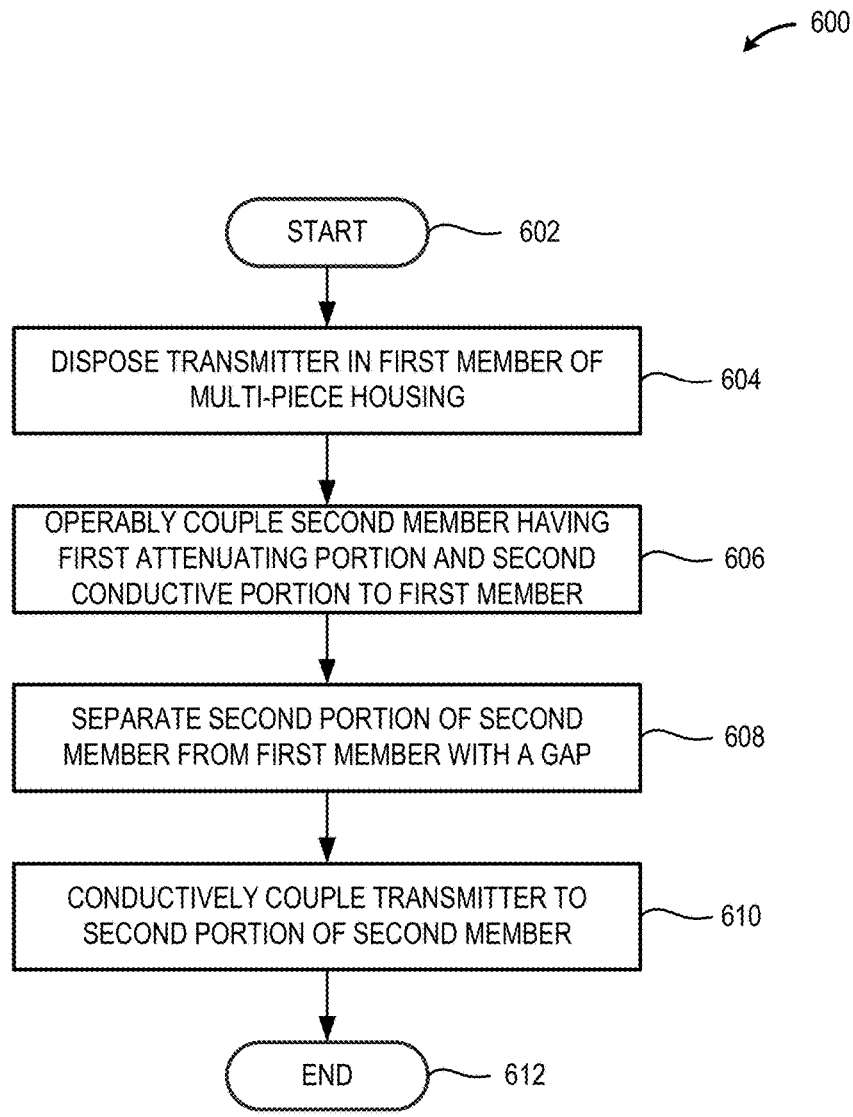
FIG. 6 is a high-level flow diagram of an illustrative method for producing an electronic device that includes a housing that includes a first member that includes a transmitter/receiver and a second member that includes a first RF-attenuating portion and a second conductive portion that is separated from the first member by a gap, in accordance with at least one embodiment of the present disclosure.

FIG. 6 is a high-level flow diagram of an illustrative method 600 for producing an electronic device 100 that includes a housing that includes a first member 102 that includes a transmitter/receiver 104 and a second member 110 that includes a first RF-attenuating portion 112 and a second conductive portion 114 that is separated from the first member 102 by a gap 130, in accordance with at least one embodiment of the present disclosure. The method 600 commences at 602.

At 604, one or more transmitters/receivers 104 are disposed in a first member 102 of a multi-piece housing. In some implementations, the one or more transmitters/receivers 104 may include a plurality of transmitters/receivers 104 at least some of which may generate or otherwise produce RF signals at different frequencies or in different frequency bands. In implementations, the one or more transmitters/receivers 104 may be stand-alone devices or may be a portion of a larger, multi-function, device such as a system on a chip (SoC) or similar.

The first member 102 may have any shape, size, or configuration. In at least some implementations, the first member 102 may include a floor member 106 that may be partially or completely surrounded by a peripheral wall 108 disposed about all or a portion of the perimeter of the floor member 106. Together, the floor member 106 and the peripheral wall 108 may define a void space 109 in the first member 102. The one or more transmitters/receivers may be disposed partially or completely within the void space 109 formed in the first member 102. In one example, the first member may include a watch case that, when attached to a band, is worn about the device user's wrist such that the device user's wrist is proximate the lower surface of the bottom member 106.

At 606, a second member 110 that includes a first, RF-attenuating, portion 112 and a second, electrically conductive, portion 114 may be operably coupled to the first member 102. In some implementations, the second member 110 forms a portion of the exterior surface of the wearable electronic device 100. In some implementations, the first, RF-attenuating, portion 112 may include a number of conductive structures, for example a number of conductive layers. In one example, the first, RF-attenuating portion 112 may include a display touch module that includes a number of transparent conductor layers. In another example, the first, RF-attenuating portion 112 may include one or more ferrite devices, such as a ferrite containing NFC antenna that provides RF-attenuation.

In some implementations, the second member 110 may be rigidly affixed to the first member 102. In some implementations, the second member 110 may be detachably attached to the first member 102. In some implementations the second member 110 may be moveably or otherwise displaceably attached to the first member 110. In some implementations, the second member 110 may be disposed distal from the user when the wearable electronic device is worn by the device user.

At 608, a gap 130 is placed or otherwise formed between the first member 102 and the second portion 114 of the second member 110. The gap 130 may maintain a spacing of from about 0.5 millimeters to about 1 millimeter between the first member 102 and the second portion 114 of the second member 110. In some implementations, the spacing and/or distanced between bye first member 102 and the second portion 114 of the second member 110 formed or otherwise produced by the gap 130 may be determined based on the frequency of the RF signals 204 produced by the one or more transmitters/receivers 104. In at least some implementations, a material may partially or completely fill the gap 130. In such implementations, the material may be selected to provide appropriate tuning parameters for adjusting or otherwise tuning the frequency of the antenna provided by the second member 110.

At 610, one or more electrically conductive members 120 may conductively couple the one or more transmitters/receivers 104 to some or all of the second portion 114 of the second member 110. In some implementations, each of a plurality of electrically conductive members 120 may conductively couple the one or more transmitters/receivers 104 to respective ones of a corresponding plurality of segments forming the second portion 114 of the second member 110. In embodiments, the segments forming the second portion 114 of the second member 110 may be electrically isolated. In embodiments, each of the plurality of segments second portion 114 of the second member 110 may serve as an antenna for respective ones of a plurality of RF signals provided by the one or more transmitters/receivers 104. The method 600 concludes at 612.

Figure 7:
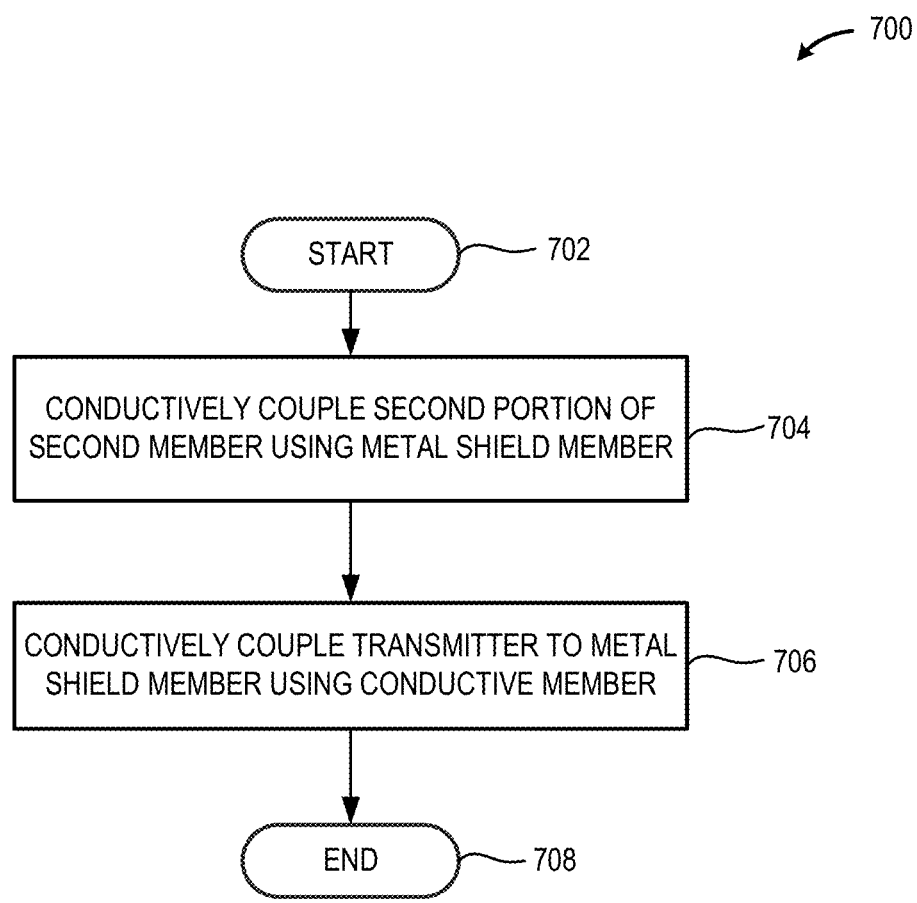
FIG. 7 is a high-level flow diagram of an illustrative method for producing an electronic device that includes a shield member conductively coupled to at least some of the second portion of the second member and includes a number of electrically conductive members conductively coupling the one or more transmitter/receivers to the shield member, in accordance with at least one embodiment of the present disclosure.

FIG. 7 is a high-level flow diagram of an illustrative method 700 for producing an electronic device 100 that includes a shield member 302 conductively coupled to at least some of the second portion 114 of the second member 110 and includes a number of electrically conductive members 120 conductively coupling the one or more transmitters/receivers 104 to the shield member 302, in accordance with at least one embodiment of the present disclosure. The method 700 commences at 702.

At 704, a shield member 302 may be conductively coupled to some or all of the second portion 114 of the second member 110. The shield member 302 may include or may be fabricated using one or more electrically conductive materials such as one or more metals or metal alloys.

In embodiments, the shield member 302 may include a plurality of segments or segmented sections. In such embodiments, some or all of the number of segments may be physically coupled together. In such embodiments, some or all of the number of segments may be electrically isolated from at least some of the remaining segments forming the shield member 302. In such embodiments, each of the plurality of segments forming the shield member 302 may electrically conductively couple to respective ones of a plurality of segments forming the second portion 114 of the second member 110.

At 706, the one or more electrically conductive members 120 may conductively couple the one or more transmitters/receivers 104 to the shield member 302. In some implementations, each of a plurality of electrically conductive members 120 may be conductively coupled to respective ones of the plurality of segments forming the shield member 302. The method 700 concludes at 708.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, coils, transmission lines, slow-wave transmission lines, transformers, and so forth), integrated circuits, application specific integrated circuits (ASIC), wireless receivers, transmitters/receivers, transceivers, smart antenna arrays for beamforming and electronic beam steering used for wireless broadband communication or radar sensors for autonomous driving or as gesture sensors replacing a keyboard device for tactile internet experience, screening sensors for security applications, medical sensors (cancer screening), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The following examples pertain to further embodiments. The following examples of the present disclosure may comprise subject material such devices, systems, methods, and means for providing a wearable electronic device 100 that includes a first member 102 and a second member 110. The second member 110 may include a first, RF-attenuating, portion 112 and a second, electrically conductive, portion 114. One or more transmitters/receivers 104 disposed in the first member 102 is conductively coupled to the second portion 114 of the second member 110 such that RF signals 204 generated by the one or more transmitters/receivers 104 are emitted/received from the second portion 114 of the second member 110, avoiding the attenuation of the first portion 112 of the second member 110 and minimizing the incidence of the RF signals on the device user. Such an arrangement beneficially improves the energy efficiency of the electronic device and minimizes the impact of the emitted RF signals on the device user.

According to example 1, there is provided a wearable electronic device. The wearable electronic device may include a multi-piece housing that includes at least a first member worn proximate a user's body, and an operably coupled, electrically isolated, second member, where the second member includes at least a first portion that includes a material that attenuates radio frequency energy and a second portion that includes an electrically conductive material; and where a gap physically separates the first member from at least the second portion of the second member. The wearable electronic device may also include a transmitters/receiver disposed at least partially within the first member and at least one conductive member conductively coupling the transmitters/receiver to the second portion of the second member.

Example 2 may include elements of example 1 where the material that attenuates radio frequency energy may include at least one layer of conductive material.

Example 3 may include elements of example 2 where the at least one layer of conductive material may form at least a portion of a display touch module (DTM).

Example 4 may include elements of example 3 where the at least one conductive member may include a conductive shield member disposed between the first member and the second member, the conductive shield member electrically conductively coupled to the second portion of the second member and an electrically conductive member conductively coupling the conductive shield member to the transmitter/receiver.

Example 5 may include elements of example 4 where the conductive shield member may be disposed between the display touch module and the transmitter/receiver.

Example 6 may include elements of example 5, and may additionally include a Near Field Communication (NFC) antenna, wherein the conductive shield member is disposed between the NFC antenna and the transmitter/receiver.

Example 7 may include elements of example 4 where the transmitter/receiver may include at least one frequency diplexer and the second portion of the second member comprises a multi-band antenna.

Example 8 may include elements of any of examples 1 through 7 where the multi-piece housing may include a wristwatch, the first member comprises at least a portion of a case of the wristwatch and the second member comprises at least a portion of a bezel of the wristwatch.

Example 9 may include elements of any of examples 1 through 7 where the gap physically separating the first member from the second portion of the second member may include a physical gap having a dimension of from about 0.5 millimeters (mm) to about 1 mm.

Example 10 may include elements of any of examples 1 through 6 where the transmitter/receiver may include a transceiver; and where the second portion of the second member may include a single band antenna tuned for use with at least one of: a global navigation satellite system (GNSS) transceiver; a BLUETOOTH® transceiver; or an IEEE 802.11 compliant (Wi-Fi) transceiver.

According to example 11, there is provided a radio frequency (RF) signal transmission method using a wearable electronic device. The method may include disposing a transmitter/receiver at least partially in a first member of a wearable multi-piece electronic device housing; operably coupling a second member of the multi-piece electronic device housing to the first member, the second member electrically isolated from the first member, the second member including at least a first portion that includes a material that attenuates radio frequency energy and a second portion that includes an electrically conductive material; separating at least the second portion of the second member from the first member via a gap; and conductively coupling the second portion of the second member to the transmitter/receiver via at least one conductive member.

Example 12 may include elements of example 11 where operably coupling a second member of the multi-piece electronic device housing to the first member, the second member including at least a first portion that includes a material that attenuates RF energy may include operably coupling a second member of the multi-piece electronic device housing to the first member, the first portion of the second member including at least one layer of conductive material that attenuates the RF energy.

Example 13 may include elements of example 12 where operably coupling a second member of the multi-piece electronic device housing to the first member, the first portion of the second member including at least one layer of conductive material that attenuates the RF energy may include operably coupling a second member of the multi-piece electronic device housing to the first member, the first portion of the second member including at least one display touch module (DTM).

Example 14 may include elements of example 13 where conductively coupling the second portion of the second member to the transmitter/receiver via at least one conductive member may include conductively coupling the second portion of the second member to the transmitter/receiver via a conductive shield member disposed between the first member and the second member, the conductive shield member electrically conductively coupled to the second portion of the second member and an electrically conductive member conductively coupling the conductive shield member to the transmitter/receiver.

Example 15 may include elements of example 14 where conductively coupling the second portion of the second member to the transmitter/receiver via a conductive shield member disposed between the first member and the second member may include conductively coupling the second portion of the second member to the transmitter/receiver via a conductive shield member disposed between the display touch module and the transmitter/receiver.

Example 16 may include elements of example 15, and the method may additionally include disposing a Near Field Communication (NFC) antenna between the display touch module and the conductive shield member.

Example 17 may include elements of example 14 where disposing a transmitter/receiver at least partially in a first member of a wearable multi-piece electronic device housing may include disposing a transmitter/receiver that includes at least one frequency diplexer at least partially in the first member of the wearable multi-piece electronic device housing the transmitter/receiver.

Example 18 may include elements of any of examples 11 through 17 where disposing a transmitter/receiver at least partially in a first member of a wearable multi-piece electronic device housing may include disposing the transmitter/receiver at least partially in the first member of a wristwatch, the first member including at least a portion of a case of the wristwatch and the second member including at least a portion of a bezel of the wristwatch.

Example 19 may include elements of any of examples 11 through 17 where separating at least the second portion of the second member from the first member via a gap may include separating at least the second portion of the second member from the first member via a gap having a separation distance of from about 0.5 millimeters (mm) to about 1 mm between the first member and the second portion of the second member.

Example 20 may include elements of any of examples 11 through 16 where disposing a transmitter/receiver at least partially in a first member of a wearable multi-piece electronic device housing may include disposing a transceiver at least partially in the first member of the wearable multi-piece electronic device housing; and where operably coupling the second member of the multi-piece electronic device housing to the first member, the second member including a second portion that includes an electrically conductive material may include operably coupling the second member of the multi-piece electronic device housing to the first member, the second member including a second portion that includes a single band antenna tuned for use with at least one of: a global navigation satellite system (GNSS) transceiver; a BLUETOOTH® transceiver; or an IEEE 802.11 compliant (Wi-Fi) transceiver.

According to example 21, there is provided a radio frequency (RF) signal transmission system using a wearable electronic device. The system may include a means for disposing a transmitter/receiver at least partially in a first member of a wearable multi-piece electronic device housing, a means for operably coupling a second member of the multi-piece electronic device housing to the first member, the second member electrically isolated from the first member, the second member including at least a first portion that includes a material that attenuates radio frequency energy and a second portion that includes an electrically conductive material, a means for separating at least the second portion of the second member from the first member via a gap; and a means for conductively coupling the second portion of the second member to the transmitter/receiver via at least one conductive member.

Example 22 may include elements of example 21 where the means for operably coupling a second member of the multi-piece electronic device housing to the first member, the second member including at least a first portion that includes a material that attenuates RF energy may include a means for operably coupling a second member of the multi-piece electronic device housing to the first member, the first portion of the second member including at least one layer of conductive material that attenuates the RF energy.

Example 23 may include elements of example 22 where the means for operably coupling a second member of the multi-piece electronic device housing to the first member, the first portion of the second member including at least one layer of conductive material that attenuates the RF energy may include a means for operably coupling the second member of the multi-piece electronic device housing to the first member, the first portion of the second member including at least one display touch module (DTM).

Example 24 may include elements of example 23 where the means for conductively coupling the second portion of the second member to the transmitter/receiver via at least one conductive member may include a means for conductively coupling the second portion of the second member to the transmitter/receiver via a conductive shield member disposed at least partially between the first member and the second member, the conductive shield member electrically conductively coupled to the second portion of the second member and an electrically conductive member means for conductively coupling the conductive shield member to the transmitter/receiver.

Example 25 may include elements of example 24 where the means for conductively coupling the second portion of the second member to the transmitter/receiver via a conductive shield member disposed between the first member and the second member may include a means for conductively coupling the second portion of the second member to the transmitter/receiver via a conductive shield member disposed at least partially between the display touch module and the transmitter/receiver.

Example 26 may include elements of example 25, and may additionally include a means for disposing a Near Field Communication (NFC) antenna between the display touch module and the conductive shield member.

Example 27 may include elements of example 24 where the means for disposing a transmitter/receiver at least partially in a first member of a wearable multi-piece electronic device housing may include a means for disposing a transmitter/receiver that includes at least one frequency diplexer at least partially in the first member of the wearable multi-piece electronic device housing the transmitter/receiver.

Example 28 may include elements of any of examples 21 through 27 where the means for disposing a transmitter/receiver at least partially in a first member of a wearable multi-piece electronic device housing may include a means for disposing the transmitter/receiver at least partially in the first member of a wristwatch, the first member including at least a portion of a case of the wristwatch and the second member including at least a portion of a bezel of the wristwatch.

Example 29 may include elements of any of examples 21 through 27 where the means for separating at least the second portion of the second member from the first member via a gap may include a means for separating at least the second portion of the second member from the first member via a gap having a separation distance of from about 0.5 millimeters (mm) to about 1 mm between the first member and the second portion of the second member.

Example 30 may include elements of any of examples 21 through 26 where the means for disposing a transmitter/receiver at least partially in a first member of a wearable multi-piece electronic device housing comprises a means for disposing a transceiver at least partially in the first member of the wearable multi-piece electronic device housing and where the means for operably coupling the second member of the multi-piece electronic device housing to the first member, the second member including a second portion that includes an electrically conductive material comprises: a means for operably coupling the second member of the multi-piece electronic device housing to the first member, the second member including a second portion that includes a single band antenna tuned for use with at least one of: a global navigation satellite system (GNSS) transceiver; a BLUETOOTH® transceiver; or an IEEE 802.11 compliant (Wi-Fi) transceiver.

Example 31 may include elements of any of examples 21 through 26 where the means for conductively coupling the second portion of the second member to the transmitter via at least one conductive member comprises: a means for conductively coupling a first segment of the second portion of the second member to the transmitter to transmit/receive RF signals in a first frequency band; and a means for conductively coupling a second segment of the second portion of the second member to the transmitter to transmit/receive RF signals in a second frequency band that is different from the first frequency band. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A wearable electronic device, comprising:
   a multi-piece housing that includes at least a first member worn proximate a user's body, and an operably coupled, electrically isolated, second member;
      wherein the second member includes at least a first portion that includes a material that attenuates radio frequency energy and a second portion that includes an electrically conductive material; and
      wherein a gap physically separates the first member from at least the second portion of the second member;
   a transmitter/receiver disposed at least partially within the first member; and
   at least one conductive member conductively coupling the transmitter/receiver to the second portion of the second member.

2. The wearable electronic device of claim 1 wherein the material that attenuates radio frequency energy comprises at least one layer of conductive material.

3. The wearable electronic device of claim 2 wherein the at least one layer of conductive material forms at least a portion of a display touch module (DTM).

4. The wearable electronic device of claim 3 wherein the at least one conductive member comprises:

a conductive shield member disposed between the first member and the second member, the conductive shield member electrically conductively coupled to the second portion of the second member; and an electrically conductive member conductively coupling the conductive shield member to the transmitter/receiver.

5. The wearable electronic device of claim 4 wherein the conductive shield member is disposed between the display touch module and the transmitter/receiver.

6. The wearable electronic device of claim 5 further comprising a Near Field Communication (NFC) antenna, wherein the conductive shield member is disposed between the NFC antenna and the transmitter.

7. The wearable electronic device of claim 4 wherein the transmitter includes at least one frequency diplexer and the second portion of the second member comprises a multi-band antenna.

8. The wearable electronic device of claim 1 wherein the multi-piece housing comprises a wristwatch, the first member comprises at least a portion of a case of the wristwatch and the second member comprises at least a portion of a bezel of the wristwatch.

9. The wearable electronic device of claim 1 wherein the gap physically separating the first member from the second portion of the second member comprises a physical gap having a dimension of from about 0.5 millimeters (mm) to about 1 mm.

10. The wearable electronic device of claim 1:
wherein the transmitter comprises a transceiver; and
wherein the second portion of the second member comprises a single band antenna tuned for use with at least one of: a global navigation satellite system (GNSS) transceiver; a BLUETOOTH® transceiver; or an IEEE 802.11 compliant (Wi-Fi) transceiver.

11. A radio frequency (RF) signal transmission method using a wearable electronic device, the method comprising:
disposing a transmitter/receiver at least partially in a first member of a wearable multi-piece electronic device housing;
operably coupling a second member of the multi-piece electronic device housing to the first member, the second member electrically isolated from the first member, the second member including at least a first portion that includes a material that attenuates radio frequency energy and a second portion that includes an electrically conductive material;
separating at least the second portion of the second member from the first member via a gap; and
conductively coupling the second portion of the second member to the transmitter/receiver via at least one conductive member.

12. The RF signal transmission method of claim 11 wherein operably coupling a second member of the multi-piece electronic device housing to the first member, the second member including at least a first portion that includes a material that attenuates RF energy comprises:
operably coupling a second member of the multi-piece electronic device housing to the first member, the first portion of the second member including at least one layer of conductive material that attenuates the RF energy.

13. The RF signal transmission method of claim 12 wherein operably coupling a second member of the multi-piece electronic device housing to the first member, the first portion of the second member including at least one layer of conductive material that attenuates the RF energy comprises:
operably coupling a second member of the multi-piece electronic device housing to the first member, the first portion of the second member including at least one display touch module (DTM).

14. The RF signal transmission method of claim 13 wherein conductively coupling the second portion of the second member to the transmitter/receiver via at least one conductive member comprises:
conductively coupling the second portion of the second member to the transmitter/receiver via a conductive shield member disposed between the first member and the second member, the conductive shield member electrically conductively coupled to the second portion of the second member and an electrically conductive member conductively coupling the conductive shield member to the transmitter/receiver.

15. The RF signal transmission method of claim 14 wherein conductively coupling the second portion of the second member to the transmitter/receiver via a conductive shield member disposed between the first member and the second member comprises:
conductively coupling the second portion of the second member to the transmitter/receiver via a conductive shield member disposed between the display touch module and the transmitter/receiver.

16. The RF signal transmission method of claim 15 further comprising:
disposing a Near Field Communication (NFC) antenna between the display touch module and the conductive shield member.

17. The RF signal transmission method of claim 14 wherein disposing a transmitter/receiver at least partially in a first member of a wearable multi-piece electronic device housing comprises:
disposing a transmitter/receiver that includes at least one frequency diplexer at least partially in the first member of the wearable multi-piece electronic device housing the transmitter.

18. The RF signal transmission method of claim 11 wherein disposing a transmitter/receiver at least partially in a first member of a wearable multi-piece electronic device housing comprises:
disposing the transmitter/receiver at least partially in the first member of a wristwatch, the first member including at least a portion of a case of the wristwatch and the second member including at least a portion of a bezel of the wristwatch.

19. The RF signal transmission method of claim 11 wherein separating at least the second portion of the second member from the first member via a gap comprises:
separating at least the second portion of the second member from the first member via a gap having a separation distance of from about 0.5 millimeters (mm) to about 1 mm between the first member and the second portion of the second member.

20. The RF signal transmission method of claim 11:
wherein disposing a transmitter at least partially in a first member of a wearable multi-piece electronic device housing comprises disposing a transceiver at least partially in the first member of the wearable multi-piece electronic device housing; and
wherein operably coupling the second member of the multi-piece electronic device housing to the first member, the second member including a second portion that includes an electrically conductive material comprises: operably coupling the second member of the multi-piece electronic device housing to the first member, the second member including a second portion that includes a single band antenna tuned for use with at least one of: a global navigation satellite system (GNSS) transceiver; a BLUETOOTH® transceiver; or an IEEE 802.11 compliant (Wi-Fi) transceiver.

21. A radio frequency (RF) signal transmission system using a wearable electronic device, the system comprising:
   a means for disposing a transmitter/receiver at least partially in a first member of a wearable multi-piece electronic device housing;
   a means for operably coupling a second member of the multi-piece electronic device housing to the first member, the second member electrically isolated from the first member, the second member including at least a first portion that includes a material that attenuates radio frequency energy and a second portion that includes an electrically conductive material;
   a means for separating at least the second portion of the second member from the first member via a gap; and
   a means for conductively coupling the second portion of the second member to the transmitter/receiver via at least one conductive member.

22. The RF signal transmission system of claim 21 wherein the means for operably coupling a second member of the multi-piece electronic device housing to the first member, the second member including at least a first portion that includes a material that attenuates RF energy comprises:
   a means for operably coupling a second member of the multi-piece electronic device housing to the first member, the first portion of the second member including at least one layer of conductive material that attenuates the RF energy.

23. The RF signal transmission system of claim 22 wherein the means for operably coupling a second member of the multi-piece electronic device housing to the first member, the first portion of the second member including at least one layer of conductive material that attenuates the RF energy comprises:
   a means for operably coupling the second member of the multi-piece electronic device housing to the first member, the first portion of the second member including at least one display touch module (DTM).

24. The RF signal transmission system of claim 23 wherein the means for conductively coupling the second portion of the second member to the transmitter via at least one conductive member comprises:
   a means for conductively coupling the second portion of the second member to the transmitter/receiver via a conductive shield member disposed at least partially between the first member and the second member, the conductive shield member electrically conductively coupled to the second portion of the second member and an electrically conductive member means for conductively coupling the conductive shield member to the transmitter/receiver.

25. The RF signal transmission system of claim 24 wherein the means for conductively coupling the second portion of the second member to the transmitter/receiver via a conductive shield member disposed between the first member and the second member comprises:
   a means for conductively coupling the second portion of the second member to the transmitter/receiver via the conductive shield member disposed at least partially between the display touch module and the transmitter/receiver.

* * * * *